United States Patent Office 3,440,075
Patented Apr. 22, 1969

3,440,075
GOLDEN FLAKE PIGMENTS COATED WITH SILVER AND HYDROUS OXIDES
William J. Marshall, Wilmington, Del., assignor to E. I. du Pont de Nemours and Company, Wilmington, Del., a corporation of Delaware
No Drawing. Filed Feb. 6, 1967, Ser. No. 614,015
Int. Cl. C09c 1/68, 1/36, 1/28
U.S. Cl. 106—291                                8 Claims

ABSTRACT OF THE DISCLOSURE

Flake pigments with a brilliant golden sparkle consisting of a pigmentary size mica or glass flake substrate coated with a thin layer of silver in particulate form (0.020 gram to 0.40 gram of silver per square meter of flake surface), overcoated with a translucent layer of a hydrous oxide ($SiO_2$, $TiO_2$ or $Fe_2O_3$).

BACKGROUND OF THE INVENTION

Nacreous flake pigments made up of a translucent micaceous flake substrate coated with a thin, adherent layer of metal oxide particles selected from hydrous $TiO_2$ or $ZrO_2$, overcoated with a translucent layer of a different metal oxide to provide light interference effects, are disclosed in U.S. Patents 3,087,828 and 3,087,829.

It has now been found that an improved novel stabilized colored flake pigment, consisting essentially of a flake substrate of mica or glass coated with a layer of silver in particulate form over which a layer of a suitable translucent, protective hydrous oxide, especially amorphous silica, is superimposed, yields an unexpectedly brilliant, mirror-like golden colored pigment having a desirable highly lustrous sparkle.

SUMMARY OF THE INVENTION

The brilliant golden flake pigments resulting from this invention consist of a suitable flake substrate, such as pigmentary mica or glass, having a layer of silver in particulate form and specified amount (0.020 gram to 0.40 gram of silver per square meter of flake surface) deposited on such substrate, and over which silver coating a translucent layer of a hydrous oxide, such as that of $SiO_2$, $TiO_2$, $Fe_2O_3$, or their mixtures, is deposited.

DESCRIPTION OF PREFERRED EMBODIMENT

In producing the improved flake pigments of this invention, a thin, particulate layer of silver is initially deposited on a pigmentary type of mica or glass substrate, and in amounts ranging from 0.20 gm./m.$^2$ to about 0.40 gm./m.$^2$ of said substrate. Preferably, such amounts range from about 0.28 to 0.30 gram of silver per square meter of flake surface. Such thickness of silver deposition can be realized by slurrying the substrate in a suitable solution of a silver salt, such as $AgNO_3$, in desired concentration, followed by reduction of the salt with formaldehyde or Rochelle salts (potassium-sodium tartrate). The resulting slurry is then filtered and the presscake is washed free of soluble salts and dried.

The mica or glass substrate used must be of flake-like nature. That is, it is made up of substantially clear, colorless particles having two dimensions (length and width) of similar magnitude which characteristically are much greater than the third dimension. The preferred flake should have major dimension in the order of 30 microns or less with a thickness not greater than about 1.0 micron. For most pigment purposes, the very fine particles employed in Example II below (substantially all of which pass through a 400-mesh screen and of surface area about 4.5 m.$^2$/gm.) are preferred for use. For other uses, such as for coloring relatively thick plastic articles, much larger particles, such as employed in Example I below, having dimensions up to as much as 1 mm. square can be employed.

The product recovered from the silver coating step is then coated with a layer of an amorphous hydrous oxide, preferably that of silica. This is preferably accomplished in a stepwise procedure, as shown in Example II below, by the thermal hydrolysis of a dilute solution of sodium silicate. The slurry from the hydrolytic precipitation is filtered and the recovered presscake is washed and dried to give the desired pigment exhibiting brilliant silvery sparkle.

The products of this invention are useful as pigments in various applications for forming colored compositions, e.g., paints, printing inks, enamels, plastic films, and rubber articles. In the finer particle size ranges, they are highly useful in such coating compositions as automotive enamels and the like. The products of both small and larger particle size are suitable for use in coloring various plastic compositions, such as floor tile, combs, auto interiors and the like.

To a clearer understanding of the invention, the following specific examples (wherein parts mentioned are by weight) are given. These are only illustrative and are not to be construed as limiting the underlying principles and scope of the invention.

Example I

In this example silver coated mica flakes are coated with hydrous $TiO_2$. One hundred parts of the mica flakes employed in the example (surface area of 1 m.$^2$/gm.) are first cleaned by slurrying in 1000 parts of water, to which is then added 140 parts of a chromate cleaning solution (4000 parts of conc. $H_2SO_4$ added to 70 parts of sodium dichromate solution—69% $Na_2Cr_2O).2H_2O$). After stirring for 2–5 minutes, the flakes are filtered, washed chromate free, and the wet presscake is added to 1000 parts of a stannous chloride solution (10 parts of $SnCl_2.2H_2O+35$ parts of conc. $HCl+955$ parts of water). The slurry is then stirred for about 5 minutes and the product is filtered and washed free of chloride.

The recovered wet presscake of treated flake is then added to 1350 parts of a solution containing 36 parts of silver nitrate and 33 parts of ammonium hydroxide (28% $NH_3$). To this is added rapidly a solution of 41 parts of formaldehyde (36%) in 1350 parts of water. The slurry is stirred for at least 2 minutes, then filtered and the presscake is washed and dried. The resulting flakes now display a brilliant silvery sparkle and contain about 22% silver, which is equivalent to about 0.28 gram of silver per square meter of mica surface. Twenty parts of an aqueous acidic titanyl sulfate solution (15% available $TiO_2$) is diluted with 3100 parts of water at a temperature below 18° C. To this is added 25 parts of the above silver-coated mica (22% silver, surface area 1 m.$^2$/gram) and the mixture is stirred and slowly warmed to about 25° C. Stirring is continued at room temperature or slightly above for 3 to 6 hours. After about 3 hours of stirring, the flakes develop a golden color which gradually increases in redness on further stirring. When the desired shade is achived, the slurry is filtered, washed free of soluble salts and dried. The product consist of brilliant golden flakes, which exhibit some iridescence in air, but show only the brilliant golden color when dispersed in coating compositions or in plastic films.

Example II

In this example mica of finer particle size and higher surface area than of Example I is used which requires a higher dilution at the point of deposition of the silver, with the final product containing a higher percentage of silver to obtain coatings of a comparable thickness. In this instance, 10 parts of mica, substantially all of which passes through a 400-mesh screen and has a surface area of 4.5 square meters per gram, is slurried in 100 parts of water containing 1 part of stannous chloride ($SnCl_2.2H_2O$) and 3.5 parts of conc. HCl. The slurry is stirred about 5 minutes, then filtered and the presscake washed free of chloride. The presscake is re-slurried in 2640 parts of water containing a solution of 20 parts of silver nitrate and 18 parts of ammonium hydroxide (28% $NH_3$) in 340 parts of water. A solution of 22 parts of formaldehyde (36%) in 3000 parts of water is then added rapidly with good agitation, and stirring is continued for 5 to 10 minutes. The slurry is filtered, and the presscake is washed free of soluble salts and dried. The product consists of flakes exhibiting a brilliant silver sparkle. They contain about 57% silver, which corresponds to 0.295 gram of silver per square meter of mica surface.

The silver-coated mica product is then subjected to the following sequence of treatments to provide an adequate thickness of silica coating thereon:

Twenty-two parts of sodium silicate solution (containing 28.4% $SiO_2$-$Na_2O$:$SiO_2$ ratio =1:3.3) is added to 625 parts of water containing 7.1 parts of $Na_2SO_4$ to give a solution with a pH of 10.7. To this solution 25 parts of the silver-coated mica flakes is added and the resulting slurry is heated with agitation to the boil and maintained at the boil under reflux for 7 hours, during which time the pH rises to about 11.0. The flakes are filtered, washed thoroughly and reslurried in 1350 parts of water, to which are added 44 parts of similar sodium silicate solution and 14.2 parts of sodium sulfate ($Na_2SO_4$). The charge is heated to the boil and kept at the boil under reflux for about 16 hours, then filtered and washed.

The presscake is again reslurried in 625 parts of water containing 22 parts of sodium silicate and 7.1 parts of $Na_2SO_4$ and heated under reflux for 7 hours, filtered and washed. The presscake is again reslurried in 1350 parts of water containing 44 parts of sodium silicate and 14.2 parts of $Na_2SO_4$. After boiling under reflux for 16 hours, filtering and washing, a final treatment is performed in 625 parts of water containing 22 parts of sodium silicate and 7.1 parts of $Na_2SO_4$ for about 7 hours at the boil under reflux. The product is isolated by filtration, washed and dried, and consists of brilliant gold flakes. Their distinctive color is manifested both in air and when the product is dispersed in paint vehicles or in plastics, such as polyethylene. During the last stages of the treatment, progressive changes in the color of the flakes may be noted, making it possible to alter the hue of the final product by terminating the treatment sooner.

Example III

In this example silver coated mica, prepared in accordance with the procedure of Example I, is coated with hydrous ferric oxide ($Fe_2O_3$). To a solution of 12.5 parts of $FeCl_3$ (anhydrous) and 12.5 parts of conc. HCl in 100 parts of warm water diluted with 500 parts of water containing 20 parts of sodium acetate ($NaC_2H_3O_2$) to give a solution of pH about 6.0, is added 100 parts of the silvered mica flake of Example I (22% silver, specific surface 1 $m.^2$/gram). The slurry obtained is then heated to 65° C. and stirred for about 45 minutes at this temperature. During this stage of operation hydrous iron oxide is deposited on the flakes, while some is precipitated in the free form and is readily removed by repeated dilution and decantation. Finally, the slurry is filtered and the presscake is washed and dried to give flakes exhibiting a brilliant red gold color.

Example IV

This example is illustrative of the coating of glass flakes with silver and overcoating with hydrous $SiO_2$. One hundred parts of glass flakes (surface area—1 $m.^2$/gram) is added to 1000 parts of a stannous chloride solution (prepared from 10 parts of $SnCl_2.2H_2O$, 35 parts of conc. HCl, and 955 parts of water). The slurry is stirred for about 5 minutes and filtered, and the presscake is washed free of chloride. The wet presscake is reslurried in 1350 parts of a solution containing 36 parts of silver nitrate and 33 parts of ammonium hydroxide (28% $NH_3$). To this is added rapidly a solution of 41 parts of formaldehyde (36%) in 1350 parts of water. Stirring is continued for at least 2 minutes, whereupon metallic silver is deposited on the glass flakes imparting thereto a brilliant silvery sparkle. The slurry is filtered and the presscake is washed and dried to give a flake pigment exhibiting a brilliant silvery sparkle and containing about 22% silver, corresponding to about 0.28 gm. of silver per square meter of glass surface.

A slurry of 25 parts of the silver-coated flakes of this example dispersed in sodium silicate solution as described in Example II is given the series of hydrous $SiO_2$ coating treatments described in that example. Brilliant golden yellow flakes useful for coloring coating compositions, plastic films and the like are obtained.

Example V

Ten parts of silver-coated mica of Example I is added to 335 parts of water containing 2 parts of sodium silicate solution to give a pH of 9.5–10.0. Two solutions, the one 3.9 parts of conc. $H_2SO_4$ in 335 parts of water, and the other 23.3 parts of sodium silicate solution (containing 28.4% $SiO_2$, $Na_2O$:$SiO_2$=1:3.3) in 335 parts of water, are separately prepared. These are added simultaneously to the stirred flake suspension at 95° C. over a period of about 2 hours. The pH is checked periodically and maintained at 9.5–10.0 by the addition of portions of ammonium hydroxide solution as required. Heating is continued at 95° C. for about 30 minutes after the addition of reagents is complete. The slurry is filtered and the presscake washed and dried to give golden colored pigment flakes.

The amount of silver deposited can be varied over a wide range in proportion to the amounts of silver nitrate and formaldehyde solutions used per unit weight of flake substrate, the concentrations and relative amounts of each, however, remaining essentially constant. The two basic processes shown in the examples result in the controlled deposition of approximately the same amount of silver per unit area of flake surface (0.28 to 0.30 gm./$m.^2$). However, this amount can be altered by varying the amount of silver nitrate and formaldehyde solutions per unit weight of substrate, the concentrations of the respective solutions remaining constant. For practical purposes, and to insure a particulate form of coating, the amount of silver per square meter of substrate is maintained within, as above noted, a range of from about 0.20 gm./$m.^2$ to about 0.40 gm./$m.^2$.

The effective deposition of the silver coating is related to the concentration and the surface area of the substrate, and with increase of surface area more dilute solutions are required.

The methods of depositing the silver coating comprise essentially those commonly used for silvering mirrors. The preferred process uses formaldehyde as the reducing agent, but other well-known reducing agents, including Rochelle salts, also can be used.

For the desired effectiveness in this invention, it is essential that the silver coating be particulate, as contrasted to a full mirror coating which is not. This will depend on the amount of silver per unit area of substrate, and such particulate coating of silver will obtain within the limits above set forth.

Thin silver coatings of a particulate nature on flake pigments exhibit a bright silvery appearance in air. However, when the products are immersed in a liquid with index of refraction from about 1.5 to 1.8, the flakes show a somewhat golden color which is generally quite weak. This color disappears when the flakes are removed from the liquid. However, the deposition of a thin layer of a transparent hydrous oxide material eliminates the air-silver interface and the weak golden color persists in air. Now, the surprising discovery is made that, as the thickness of the hydrous oxide layer is increased, there is a pronounced enhancement of the golden color until a maximum is reached as described, for instance, in Example II.

While hydrous $SiO_2$ comprises a preferred protective, translucent hydrous oxide for overcoating the silver-coated mica or glass substrate, use in also contemplated for such purpose of the hydrous forms of the following oxides, or their mixtures: $ZrO_2$, $Al_2O_3$, ZnO, $Sb_2O_3$, $SnO_2$, $Fe_2O_3$, CuO, $NiO_2$, CoO and $Cr_2O_3$. These can be precipitated by known hydrolysis or neutralization techniques. The amount of precipitated hydrous oxide required as a protective coating for the silver comprises at least 2% by weight of the total pigment and can range up to 30%, based on the silver-coated substrate. Preferably such amount ranges from 15% to 20%. The thickness of the protective coating can vary from about 20 millimicrons to about 250 millimicrons, whereby products of varying color can be obtained as the thickness of the coating increases.

The deposition of hydrous $TiO_2$ as the coating instead of silica requires the exercise of considerable care because solutions from which hydrous $TiO_2$ is precipitated are strongly acid and to some extent attack the silver coating before the hydrous $TiO_2$ coating is formed. In such deposition it is preferred to suspend to silver-coated substrate in a relatively dilute, strongly acidic solution of titanyl sulfate at ambient temperature and then hydrolyze the suspension through rapid heating to about 90–100° C. and maintaining at that temperature for about 2–3 hours to effect continuous deposition of the hydrous $TiO_2$ as formed and in particles of less than 0.1 diameter.

In coating with hydrous ferric oxide, a buffered solution is employed so that problems of acidity of the ferric salt solution are overcome. Such coatings are inherently colored, so that the final effect combines the golden color of the hydrous oxide on a particulate silver film with the reddish color of the ferric oxide to give shades of much redder hue than are obtainable with the hydrous silica counterparts.

I claim:
1. A flake pigment exhibiting a brilliant golden color and a lustrous sparkle consisting essentially of a flake substrate selected from the group consisting of mica and glass, having deposited on the surface thereof a particulate silver coating in the range of 0.02 gram to 0.40 gram of silver per square meter of flake surface, and having deposited over the silver layer a protective layer of a hydrous oxide comprising at least 2% by weight of the total pigment.

2. The pigment of claim 1 in which the hydrous oxide is that of $SiO_2$.

3. The pigment of claim 1 in which the hydrous oxide is that of $TiO_2$.

4. The pigment of claim 1 in which the hydrous oxide is that of $Fe_2O_3$.

5. The pigment of claim 1 in which the silver layer is in the range of 0.28 to 0.30 gram per square meter of substrate.

6. The pigment of claim 1 in which the flake substrate is mica with a surface area of 1–4.5 m.$^2$/gram.

7. The pigment of claim 1 in which the flake substrate is glass with a surface area of 0.5–4.0 m.$^2$/gram.

8. The pigment of claim 1 in which the substrate is pigmentary mica and the hydrous oxide is that of amorphous $SiO_2$.

References Cited

UNITED STATES PATENTS

| | | | |
|---|---|---|---|
| 2,387,243 | 10/1945 | Castor | 106—291 |
| 3,274,013 | 9/1966 | Batt | 106—291 |
| 3,342,617 | 9/1967 | Jackson | 106—291 |

FOREIGN PATENTS 665,831   1/1952   Great Britain.

JAMES E. POER, *Primary Examiner.*

U.S. Cl. X.R.

106—308